United States Patent [19]
Green

[11] 4,256,379
[45] * Mar. 17, 1981

[54] ELECTROCHROMIC DEVICE

[75] Inventor: Mino Green, London, England

[73] Assignee: Imperial Chemical Industries Limited, London, England

[*] Notice: The portion of the term of this patent subsequent to Nov. 29, 1994, has been disclaimed.

[21] Appl. No.: 5,079

[22] Filed: Jan. 22, 1979

Related U.S. Application Data

[63] Continuation of Ser. No. 813,420, Jul. 6, 1977, abandoned.

[30] Foreign Application Priority Data

Jul. 7, 1976 [GB] United Kingdom ............... 28241/76

[51] Int. Cl.³ ............................................... G02F 1/17
[52] U.S. Cl. ..................................................... 350/357
[58] Field of Search ......................................... 350/357

[56] References Cited

U.S. PATENT DOCUMENTS 3,973,829  8/1976  Giglia ..................... 350/357
4,060,311  11/1977  Green ..................... 350/357

Primary Examiner—James W. Davie
Attorney, Agent, or Firm—Cushman, Darby & Cushman

[57] ABSTRACT

An electrochromic device in the form of a cell comprising a metal-sensitive compound having a thickness of 1 micrometer or less, preferable between 0.5 and 0.05 of a micrometer, is described in contact with a solid fast ion conductor as electrolyte. The fast ion conductor itself is in contact with an electrode capable of providing ions the same as the fast ions of the conductor.

11 Claims, 4 Drawing Figures

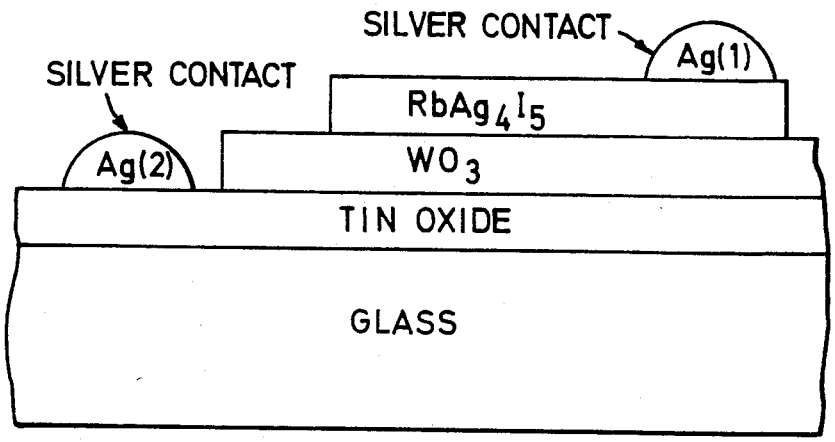
FIG. 1.
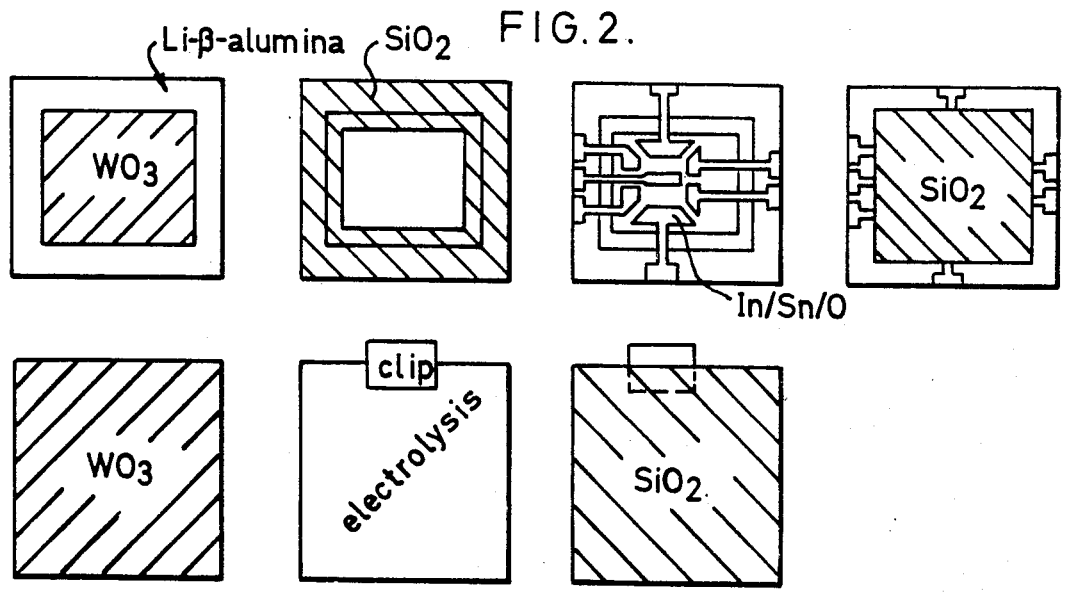
FIG. 2.
FIG. 3.
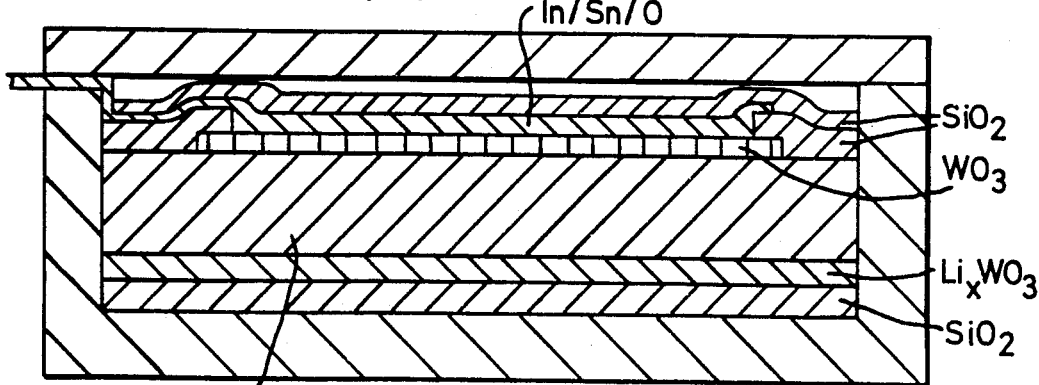
FIG. 4.

ELECTROCHROMIC DEVICE

This is a continuation of application Ser. No. 813,420 filed July 6, 1977 now abandoned.

This invention relates to electrochromic devices, that is, display devices which change colour on application of an electric potential.

Our copending U.S. patent application Ser. No. 647,440 describes an electrochromic device in the form of a cell comprising a metal-sensitive compound (as hereinafter defined) in contact with a solid fast ion conductor as electrolyte, the fast ion conductor itself being in contact with an electrode capable of providing ions the same as the fast ions of the conductor.

The present invention is an improvement of the aforementioned invention, in which the metal sensitive compound has a thickness of 1 micrometer or less, conveniently of from 1 to 0.01 of a micrometer, and preferably a thickness between 0.5 and 0.05 of a micrometer.

A thickness between 0.5 and 0.2 of a micrometer is particularly preferred.

By "metal sensitive compound" we mean a compound capable of dissolving metal atoms and which changes colour in so doing. In the electrochromic device of the invention, the metal atoms in question must, of course, be the same as those provided by discharge of the fast ions of the solid fast ion conductor.

The metal sensitive compound is preferably an oxide of a transition metal, especially tungsten oxide ($WO_3$), molybdenum oxide ($MoO_3$) or vanadium oxide ($V_2O_5$). Such oxides are capable of dissolving metal atoms, especially monovalent atoms such as atoms of an alkali metal, copper or silver, and change colour in so doing. The most usual colour change is from colourless to blue. Other metal sensitive compounds which may be mentioned are the oxides of manganese, palladium, platinum, rhenium and titanium. The colour change of these oxides following the dissolution of metal atoms therein is reversible and, in the electrochromic devices of the invention, reversal of the electric potential which originally caused the colour to be produced, causes the colour to be discharged.

In a preferred embodiment, therefore, the electrochromic device of the present invention is in the form of an electrochromic cell comprising a first electrode, a layer of a metal-sensitive transition metal oxide of thickness between 1 and 0.01 micrometer in contact with the said first electrode, a solid fast ion conductor as electrolyte in contact with the said oxide, in which fast ion conductor the fast ion is an ion of a metal which dissolves in the said oxide to change the colour thereof, and a second electrode in contact with the said electrolyte and providing a source of the said fast ions.

The use of a solid fast ion conductor as the electrolyte is an essential feature of the device. As has already been explained, the fast ion in the electrolyte must be one which, when discharged, forms an atom capable of dissolving in the metal-sensitive compound so as to cause a change of colour therein. This means that the fast ion of the fast ion conductor is preferably an alkali metal, copper or silver ion, silver being preferred.

The fast ion conductor will have a resistivity less than $1 \times 10^6$ ohm-cm, and preferably less than $1 \times 10^4$ ohm-cm, and should be a material which conducts electricity only by ionic conduction. For convenience of use the fast ion conductor preferably is of a material which may be deposited, cast or otherwise shaped into sheets or plates. Obviously it will be a material which will not react disadvantageously with or in response to the environment to which it may be exposed, (as is similarly the case for all the components), or it may be protectable (as may all the components of the device) from an environment with which it may be undesirably reactive, for example by encapsulation, to prevent chemical reaction, or by filtration to prevent or reduce, say, exposure to radiation, e.g. sunlight, where this is undesirable.

Examples of suitable silver-containing fast ion conductors are the complex halides, particularly iodides, of silver with alkali metal or quaternary ammonium ions. The salt rubidium silver pentaiodide $RbAg_4I_5$ is preferred. Other suitable complex iodides are those of the formula $QAg_6I_7$ where Q is a quaternary ammonium ion, for example, tetramethyl ammonium, ethyl trimethyl ammonium, diethyl dimethyl ammonium, trimethyl isopropyl ammonium, trimethyl propyl ammonium, triethyl methyl ammonium, tetraethyl ammonium, diethyl methyl isopropyl ammonium, triethyl propyl ammonium, butyl diethyl methyl ammonium, or hexadecyltrimethyl ammonium.

Other suitable iodides are those of the formula $C_aH_b\text{NI}.n\text{AgI}$ where a, b and n may have the values given in the following table:

| Substituted ammonium ion | a | b | n |
|---|---|---|---|
| Pyrrolidinium | 4 | 10 | 8 |
| Piperidinium | 5 | 12 | 8 |
| 1-Methylpyrrolidinium | 5 | 12 | 8 |
| 1,1-Dimethylpyrrolidinium | 6 | 14 | 7 |
| Quinuclidinium | 7 | 14 | 6.7 |
| 1,1-Dimethylpiperidinium | 7 | 16 | 8 |
| N-methylquinuclidinium | 8 | 16 | 6.7 |
| 5-Azoniaspiro(4.4)nonane | 8 | 16 | 6.7 |
| 5-Azoniaspiro(4.5)decane | 9 | 18 | 6.7 |
| 6-Azoniaspiro(5.5)undecane | 10 | 20 | 6.7 |
| Pyridinium | 5 | 6 | 8 |
| 3-Methylpyridinium | 6 | 8 | 6.7 |
| 1-Methylpyridinium | 6 | 8 | 6. |
| 1,3-Dimethylpyridinium | 7 | 10 | 6.7 |
| 3,5-Dimethylpyridinium | 7 | 10 | 6.7 |
| 2,6-Dimethylpyridinium | 7 | 10 | 6.7 |
| 1,2,6-Trimethylpyridinium | 8 | 12 | 6.7 |
| 2,4,6-Trimethylpyridinium | 8 | 12 | 6.7 |
| 1,3,5-Trimethylpyridinium | 8 | 12 | 6.7 |
| Quinolinium | 9 | 8 | 8 |
| 1,2,4,6-Tetramethylpyridinium | 9 | 14 | 6.7 |
| 1,2,3,6-Tetramethylpyridinium | 9 | 14 | 6.7 |
| 1-Methylquinolinium | 10 | 10 | 4 |
| 1,2,3,4-Tetrahydro-1-methylquinolinium | 10 | 14 | 6.7 |
| 1,2,3,4-Tetrahydro-2-methylisoquinolinium | 10 | 14 | 6.7 |
| 1,Ethylquinolinium | 11 | 12 | 4 |
| 1,2-Dimethylquinolinium | 11 | 12 | 6.7 |

In all these fast ion conductors, the fast ion is silver. Copper containing fast ion conductors may be, for example, the double bromide or cuprousbromide and N-methyltriethylene diamine bromide. Suitable alkali metal-containing fast ion conductors include sodium $\beta$-alumina, lithium $\beta$-alumina and potassium $\beta$-alumina. These are mixed oxides of $Na_2O$, $Li_2O$ or $K_2O$ and $Al_2O_3$ of variable composition. Typically, they contain from 5 to 11 aluminium oxide molecules per molecule of alkali metal oxide.

Other fast ion conductors are described as "ion-conducting crystals" in U.S. Pat. No. 3,971,624 (German Patent Application No. 2433044) and may also be employed in the device of this invention.

The fast ion conductor will preferably be white (which may be as a consequence of its crystalline configuration, or it may be a particulate colourless material e.g. alumina) or colourless, or it may be coloured, in which case the colour will be selected to provide an appropriate contrast with the metal sensitive compound in at least one of its coloured states. When the fast ion conductor is transparent it is often advantageous to employ a backing, distant from the metal sensitive compound, capable of providing an appropriate contrast with the metal sensitive compound. Such a backing may be the second electrode.

In the electrochromic cells of the present invention, the application of a potential across a solid electrolyte formed of one of the aforesaid fast ion conductors causes the fast ion to be discharged and the resulting metal atoms to become dissolved in the transition metal oxide. It is this process which causes a colour to develop in the oxide. Similarly, reversal of the potential causes metal atoms in the transition metal oxide to migrate as ions to the fast ion conductor. In order that equilibrium in the fast ion conductor shall be maintained, the electrode in contact with the fast ion conductor that is referred to above as the second electrode, must be capable of providing and accepting the fast ions. Where the fast ion is silver or copper, the second electrode may itself be of silver or copper. Moreover, since the amount of the metal atoms involved in the operation of the electrochromic cells of the present invention is usually very small, these electrodes can themselves be very small without there being any danger of any inadequate supply of the metal ions although the dimensions may vary between very wide limits and the minimum area that may be employed in any particular instance may be determined easily by simple trial. Where the fast ion conductor contains, as the fast ions, alkali metal such as sodium, lithium or potassium ions, it is usually inconvenient to make the second electrode of the alkali metal, because of the well known reactivity of these elements in the free metallic state. It is however, possible to make the second electrode of an appropriate bronze, e.g. a tungsten bronze of general formula $M_xWO_3$ where M is for example lithium, sodium or potassium and x preferably has a value between 0 and 1. Such material is capable of losing metal as the corresponding metal ion to the fast ion conductor. Ferrites comprising appropriate ions also may be employed as the second electrode for example a lithium ferrite may be used. Other suitable materials, alloys or compounds may be used in a similar manner and many are described for example in U.S. Pat. No. 3,971,624 as being suitable for the non-polarisable electrode described in that patent.

In order that the electrochromic cells of the invention shall respond rapidly to an applied potential, and be capable of rapid response to a reversal in potential, it is essential that the metal sensitive compound should be thin. Preferably also the fast ion conductor will be thin conveniently less than 1 mm, preferably less than 100μ and more preferably less than 10μ. Further, for ease of observation of the colour changes which take place it is desirable for at least one of the electrodes to be transparent to visible light. This may be achieved for example by using a suitable transparent electrode material, e.g. stannic oxide ($SnO_2$) as the first electrode in contact with the metal sensitive compound.

The use of a very thin layer of the metal sensitive compound is important particularly where rapid erasure is desired in a device in which at least some equilibration of the metal ions within the metal sensitive layer is likely to occur. Passage of a metal ion into the metal sensitive layer is sufficient to produce a colouration. However if the colouration is not immediately erased, the metal ions diffuse deeper into the metal sensitive layer until, if erasure is delayed for long enough they eventually equilibrate within the layer. It will be appreciated that after some equilibration has occurred reversal of the current across the device which causes an outflow of metal ions from the metal sensitive layer cannot completely erase the colour from the said layer until all the colour-producing metal ions have diffused to the surface and have been removed therefrom. We have found that for relatively rapid erasure (preferably of the order of 10 second and more preferably less than 1 second) following equilibration of the metal ions in the metal sensitive layer the thickness of this layer should not exceed 1 micrometer.

It will be appreciated that the new electrochromic device is made entirely of solid materials, which is an important practical advantage and makes for good strength and stability in use. Moreover, it can be constructed in a form suitable for rapid response to relatively small applied potentials of the order of 1 volt.

The invention may be illustrated by reference to the simple form of electrochromic cell which is shown in the accompanying FIG. 1.

The substrate was a glass sheet, for example a glass microscope slide. It was first coated with a layer of stannic oxide having a resistance of about 500 ohms per square. Tungstic oxide ($WO_3$) was then deposited on the thin oxide in a layer about half a micrometer thick by evaporation of the tungstic oxide from a molybdenum boat in a high vacuum. The slide was then removed from the vacuum and heated in oxygen at 320° C. to remove the blue colour of the oxide and to restore oxygen lost therefrom. Rubidium silver iodide was then evaporated onto the layer of tungstic oxide through a contact mask so as to be deposited in squares about 1 cm each way. This layer was about 1 micrometer thick. Pure $RbAg_4I_5$ was used as source material, but it was found that the deposited layer contained a small excess of silver iodide. It had a resistivity of about 25 ohms centimeters at room temperature rather than the 4 cm centimeters to be expected for the pure material. The two silver "Dag" contacts were then applied as shown in FIG. 1.

The cells were initially transparent with a faint milkiness caused by the rubidium silver pentaiodide. When a small direct current potential of approximately 1 volt was applied across the cell with the tungstic oxide as the cathode and the siliver contact marked Ag(1) as the anode, a blue coloration developed at the edge of the anode nearest to the cathode and spread over the region covered by the rubidium silver pentaiodide. The same effect could be obtained by simply short-circuiting the circuit externally, since the structure shown has a standing voltage of about 0.6 volt. If the applied potential is reversed immediately after formation of the colour, the blue colour disappears within about 6 seconds, starting at the point where it first appeared. This process can be repeated many times so long as the chemical constitution of the cell remains unchanged.

The device described above was repeated but the tungstic oxide layer was made about 5 micrometers thick and after formation of the blue colouration the cell was allowed to stand for 1 hour before reversal of the applied potential. The blue colour was not completely erased until an hour after reversal of the potential.

In some applications, it may be disadvantageous for the colour not to be produced evenly over the whole surface of the metal sensitive compound. In order to ensure even development of colour, the second electrode may be provided with a very thin coating of a highly electrically resistive transparent conductor, such as undoped zinc oxide. For local colour effects, electrodes of restricted area may be employed.

Other techniques for the preparation of the various components of devices of the invention, alternative to those described above, will be available to the skilled man, and any technique suitable for the deposition of thin layers, typically less than 1 mm, preferably less than 10 micrometers and more preferably less than 2 micrometers, may be used, particularly for the preparation of the metal sensitive material and fast ion conducting layers. Techniques capable of preparing a layer of 1 micrometer or less will be employed for the preparation of the layer of metal sensitive compound. Such techniques include electrophoretic deposition, sputtering (including reactive sputtering involving simultaneous chemical reaction, e.g. sputtering tungsten in oxygen), chemical vapour deposition from unstable compounds, and chemical precipitation as well as evaporation referred to above. Selection of the preparative technique employed will be made in the light of the chemical nature of the component to be produced as the physical form required. Where it may be relatively thick, for example in the case of a layer of $\beta$-alumina, say, 1 mm thick, it may be cut or ground from the solid. Such a sheet may conveniently be employed, as will be described below, as the substrate upon which other components of the cell may be deposited.

The components of the device will usually be smooth surfaced, but a rough surface may be advantageous in certain circumstances, e.g. for particular optical effects.

The invention is further illustrated by the following examples.

FIGS. 2 and 3 of the attached drawings represent diagrammatically the sequence of operation in the preparation of a seven segment digit display (plan) as described in Example 1. FIG. 4 shows diagrammatically a section through the completed device, in a plane vertical to that of FIGS. 2 and 3, and within a housing.

EXAMPLE 1

A substrate consisting of a 2"×2" piece of 0.5 mm thickness Li-$\beta$-alumina was mounted in a vacuum chamber. A nearby target of tungsten oxide $WO_3$ was bombarded with argon atoms (sputtered) to produce an even coating of $WO_3$ on the substrate. Each side was coated in turn, the first to a thickness of 500 nm and the second side, through an aperture 1½"×1½" in a mask to a thickness of 100 nm. The latter side then received a second film of $SiO_2$ 250 nm thick by sputtering via a mask which left uncoated an area 1"×1" centrally located in the substrate. Using a mask which delineated the well known seven segment digit pattern, an electrode of indium-tin oxide 100 nm thick was applied by sputtering from a target consisting of a compaction of an intimate mixture of tin and indium oxides $SnO_2$ of 500 nm thickness by sputtering as before. The substrate was held at room temperature throughout.

The substrate was then removed from the vacuum chamber, and taking care to avoid contact with the air, by working in a nitrogen atmosphere in a dry box, a metal (molybdenum) clip to make connection with the 500 nm $WO_3$ film was applied. The substrate was then immersed in a bath of molten anhydrous lithium nitrate at 275° C. and the clip connected to the negative pole of a current source. Using a carbon anode, current was passed until the lithium content of the $WO_3$ was calculated to be 30%. The sample was then returned to the vacuum chamber and a protective overlay of 250 nm of $SiO_2$ sputtered over the newly formed $Li_{0.3}WO_3$.

On completion of the device the working and counter electrode connections were joined, whereupon all the segments of the device (as viewed through the indium/tin oxide layer) coloured blue within 10 seconds. The colour being easily visible against the white alumina background. The blue colour was discharged by passing a current of 1 milliamp through the device for 10 seconds at 2 volts, whereupon bleaching occurred. Reversal of the current caused colouration as before.

EXAMPLE 2

A digital clock read-out comprising a series of 4 devices obtained as described in Example 1 was located within a convenient housing having a transparent area through which the digits could be viewed, and connected to a control in the form of a timing mechanism actuating a display logic system which in turn controls the activation of appropriate segments of the display.

I claim:

1. An electrochromic device comprising a first electrode, a layer of a metal-sensitive compound in contact with the first electrode and in contact with a solid fast ion conductor in which fast ion conductor the fast ion is an ion of a metal which dissolves in the metal sensitive compound to change the colour thereof, the fast ion conductor itself being in contact with a second electrode capable of providing ions the same as the fast ions of the conductor, said layer of metal sensitive compound having a thickness of 1 micrometer or less.

2. A device according to claim 1 in which the metal sensitive compound is an oxide of a transitional metal.

3. A device according to claim 2 in which the transition metal is selected from the group consisting of tungsten, molybdenum and vanadium.

4. A device according to claim 1 in which the fast ion of the fast ion conductor is selected from the group consisting of alkali metal, copper and silver ions.

5. A device according to claim 1 in which the fast ion conductor has a resistivity less than $1 \times 10^6$ ohm-cm.

6. A device according to claim 1 in which the fast ion conductor is a complex silver halide with alkali metal or quaternary ammonium ions.

7. A device according to claim 6 in which the fast ion conductor is a complex iodide.

8. A device according to claim 7 in which the fast ion conductor is rubidium silver pentaiodide.

9. A device according to claim 1 in which the fast ion conductor is an alumina.

10. A device according to claim 9 in which the alumina is selected from the group selected from lithium-$\beta$-alumina, sodium-$\beta$-alumina and potassium-$\beta$-alumina.

11. A device according to claim 1 in which the second electrode is a tungsten bronze or a ferrite.

* * * * *